(12) United States Patent
Chavda et al.

(10) Patent No.: US 9,036,623 B2
(45) Date of Patent: *May 19, 2015

(54) AGGREGATING ENDPOINT CAPABILITIES FOR A USER

(75) Inventors: Ankur Chavda, Seattle, WA (US); Sira P. Rao, Bellevue, WA (US); Mohit Talwar, Redmond, WA (US); Setty Venkateshaiah, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/368,161

(22) Filed: Feb. 7, 2012

(65) Prior Publication Data

US 2012/0195305 A1    Aug. 2, 2012

Related U.S. Application Data

(63) Continuation of application No. 11/462,874, filed on Aug. 7, 2006, now Pat. No. 8,111,686.

(51) Int. Cl.
*H04L 12/66* (2006.01)
*G06F 15/16* (2006.01)
*H04L 12/28* (2006.01)
*H04L 12/58* (2006.01)
*H04L 29/08* (2006.01)
*H04L 12/24* (2006.01)
*H04M 1/725* (2006.01)

(52) U.S. Cl.
CPC ....... *H04L 12/2856* (2013.01); *H04M 1/72566* (2013.01); *H04L 12/5815* (2013.01); *H04L 29/08684* (2013.01); *H04M 1/72563* (2013.01); *H04L 12/24* (2013.01); *H04L 12/2898* (2013.01); *H04L 41/00* (2013.01); *H04L 41/12* (2013.01)

(58) Field of Classification Search
None
See application file for complete search history.

(56) References Cited

U.S. PATENT DOCUMENTS

| | | | |
|---|---|---|---|
| 6,463,471 B1 | 10/2002 | Dreke et al. | |
| 6,658,095 B1 | 12/2003 | Yoakum et al. | |
| 6,697,840 B1 | 2/2004 | Godefroid et al. | |
| 6,839,735 B2 | 1/2005 | Wong et al. | |
| 6,987,847 B1 | 1/2006 | Murphy et al. | |
| 7,035,923 B1 * | 4/2006 | Yoakum et al. | 709/224 |
| 8,111,686 B2 | 2/2012 | Chavda et al. | |
| 2003/0095540 A1 | 5/2003 | Mulligan et al. | |
| 2003/0135624 A1 | 7/2003 | McKinnon et al. | |

(Continued)

OTHER PUBLICATIONS

M. Lonnfors, K. Kiss, User Agent Capability Extension to Presence Information Data Format, IETF Draft, Oct. 24, 2005, pp. 1-29.*

(Continued)

*Primary Examiner* — Christopher Crutchfield
(74) *Attorney, Agent, or Firm* — Andrew Smith; Jim Ross; Micky Minhas

(57) ABSTRACT

A method and system for aggregating capabilities from multiple endpoints associated with a user are provided. The system aggregates the capabilities of the endpoints associated with a user into an aggregate view of available modes of communication for reaching the user. Then, the system publishes the aggregate view so that other users who want to send communications to the user will know the modes of communication available for that user. In addition, the system may designate certain modes of communication as preferred or as capable of reaching the user.

11 Claims, 5 Drawing Sheets

(56) References Cited

U.S. PATENT DOCUMENTS

| | | | |
|---|---|---|---|
| 2004/0071150 A1* | 4/2004 | Honkala et al. | 370/401 |
| 2004/0203664 A1 | 10/2004 | Lei et al. | |
| 2004/0249776 A1 | 12/2004 | Horvitz et al. | |
| 2004/0267887 A1 | 12/2004 | Berger et al. | |
| 2005/0018659 A1 | 1/2005 | Gallant et al. | |
| 2005/0021854 A1 | 1/2005 | Bjorkner | |
| 2005/0091327 A1* | 4/2005 | Koch | 709/206 |
| 2005/0246369 A1 | 11/2005 | Oreizy et al. | |
| 2005/0276397 A1 | 12/2005 | Hiatt et al. | |
| 2006/0030264 A1 | 2/2006 | Morris | |
| 2006/0165058 A1 | 7/2006 | Caballero-McCann et al. | |
| 2006/0167977 A1* | 7/2006 | Wu et al. | 709/203 |
| 2006/0179115 A1 | 8/2006 | Garcia-Martin et al. | |

OTHER PUBLICATIONS

"IBM Lotus Sametime," © 2006 Pacific Coast Information Systems Ltd., 4 pages, http://www.pcis.com/products/ibm_lotus_sametime.html , [last accessed Apr. 26, 2006].

"Live Communications Server 2005 Overview," Microsoft Office Online, © 2006 Microsoft Corporation, 3 pages, http://www.microsoft.com/office/livecomm/prodinfo/overview.mspx , [last accessed Apr. 26, 2006].

Campbell, B. et al, Network Working Group: Request for Comments 3428, Dec. 2002, pp. 1-19.

Day, M. et al., "A Model for Presence and Instant Messaging," Feb. 2000, Network Working Group, Request for Comments 2778, Informational, © The Internet Society 2000, 15 pages, http://www.rfc-archive.org/getrfc.php?rfc=2778 , [last accessed Apr. 26, 2006].

Handel, Mark, "Presence Awareness: Multiple Sources, Multiple Roles," CHI 2001, Mar. 31-Apr. 5, Doctoral Consortium, pp. 71-72.

Jiang, D. et al., Two approaches for Advanced Presence Services in SIP Communications, 2005, pp. 172-177.

Rosenberg, J. et al., RFC 3264: An Offer/Answer Model with the Session Description Protocol (SDP), Internet Engineering Task Force, Jun. 2002, pp. 1-25.

Schulzrinne, H., "RPIDS—Rich Presence Information Data Format for Presence Based on the Session Initiation Protocol (SIP)," IETF, Feb. 21, 2003, pp. 1-20.

* cited by examiner

```
<device EPID="A">
    <capabilities uri="sip:ankurc@microsoft.com">
        <text capture="true" render="true"/>
    </capabilities>
    <timezone>00:00:00-05:00</timezone>
    <machineName>ANKURC-CELL</machineName>
</device>
```
⎫
⎬ 510
⎭

```
<device EPID="B">
    <capabilities uri="sip:ankurc@microsoft.com">
        <text capture="true" render="true"/>
        <voice capture="true" render="true"/>
        <video render="true"/>
    </capabilities>
    <capabilities uri="mailto:ankurc@microsoft.com">
        <calendar capture="true" render="true"/>
    </capabilities>
    <capabilities uri="tel:+14257064057">
        <callControl capture="true" render="true"/>
    </capabilities>
    <timezone>00:00:00-05:00</timezone>
    <machineName>ANKURC</machineName>
</device>
```
⎫
⎬ 520
⎭

```
sip:ankurc@microsoft.com
tel:+14257064057
mailto: ankur@microsoft.com
```
⎬ 530

```
<service uri="sip:ankurc@microsoft.com" preferredEndpoint="A">
    <capabilities>
        <text capture="true" render="true" preferredEndpoint="A"/>
        <calendar capture="true" render="true" preferredEndpoint="B"/>
        <voice capture="true" render="true" preferredEndpoint="B"/>
        <video render="true"/>
    </capabilities>
</service>
```
⎫
⎬ 540
⎭

```
<service uri="mailto:ankurc@microsoft.com" preferredEndpoint="A">
    <capabilities>
        <calendar capture="true" render="true" preferredEndpoint="B"/>
    </capabilities>
</service>
```
⎬ 550

```
<service uri="tel:+14257064057" preferredEndpoint="B">
    <capabilities>
        <callControl capture="true" render="true" preferredEndpoint="B"/>
    </capabilities>
</service>
```
⎬ 560

*FIG. 5*

AGGREGATING ENDPOINT CAPABILITIES FOR A USER

CROSS REFERENCE TO RELATED APPLICATION

This application is a continuation application of U.S. patent application Ser. No. 11/462,874, filed on Aug. 7, 2006, issued as U.S. Pat. No. 8,111,686, and entitled "AGGREGATING ENDPOINT CAPABILITIES FOR A USER," which is incorporated herein in its entirety by reference.

BACKGROUND

Users can be reached over many different devices that each has a variety of capabilities. For example, a user can receive an instant message or voice call on a cell phone, a video phone call or an instant message on a computer, or a Voice over Internet Protocol (VoIP) call on a Session Initiation Protocol (SIP)-enabled phone. The combinations of devices and capabilities make up the different ways of reaching a user, called modes of communication. For example, the receiving of an instant message on a cell phone is one mode of communication, the receiving of an instant message at a desktop computer is another mode of communication, and the receiving of an electronic mail message at the desktop computer is yet another mode of communication.

When attempting to communicate with a user, it is difficult to know which mode of communication will have the best chance of reaching the user, as well as the mode of communication over which the user would prefer to be reached. For example, if the user is in a meeting, the user may be reachable only via a voice call on an active (i.e., online) cell phone or an instant message on an active laptop. So communicating via either mode of communication may have the same chance of reaching the user, but placing a voice call to the user's inactive Personal Digital Assistant (PDA) may have no chance of reaching the recipient. Given the two reachable modes of communication, the user may prefer to be reached by instant message rather than by voice call because it is less disturbing. Similarly, if a user is at a loud concert with only a cell phone, the user might prefer a text message on the cell phone rather than a voice call, even though the user is reachable by both.

Current systems display the capabilities for reaching a user, but do not indicate which capabilities currently active devices provide. A sending user trying to reach a recipient may choose a capability and attempt to send a communication that may fail to reach the recipient because the user is not at the device or the device is not active. If the communication fails, then the sending user can cycle through each capability until the recipient responds to a communication. After sending each communication, the sending user may wait a while to see if the recipient responds. Such sending of multiple communications and waiting can be time-consuming and may be so frustrating that the sending user gives up trying to reach the recipient. Moreover, the recipient may become annoyed as the same communication may be received via several different modes of communication.

SUMMARY

A method and system for aggregating capabilities from multiple endpoints associated with a user are provided. A system determines the capabilities of each active endpoint of a user. Each endpoint may have different capabilities such as instant messaging, voice, and video calling through which the user can be reached. The system aggregates the capabilities of the endpoints associated with a user into an aggregate view of available modes of communication for reaching the user. Then the system publishes the aggregate view so that other users who want to send communications to the user will know the modes of communication available for that user. In addition, the system may designate certain modes of communication as preferred or as capable of reaching the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 illustrates the XML produced by the aggregate capabilities component in one embodiment.

DETAILED DESCRIPTION

Figure 1:
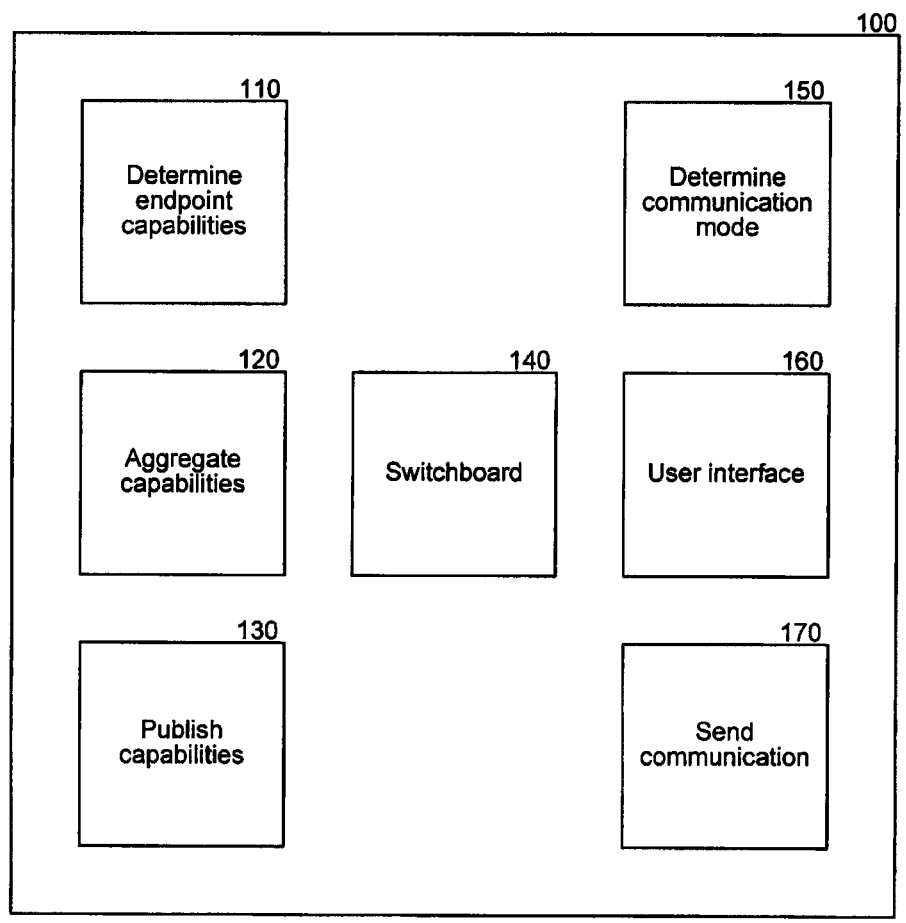
FIG. 1 is a block diagram that illustrates components of the system in one embodiment.

A method and system for aggregating capabilities from multiple endpoints associated with a user are provided. In one embodiment, a presence system determines the capabilities of each active endpoint of a user. For example, the user may have a cell phone endpoint, a laptop endpoint, and a desktop endpoint. Each endpoint may have different capabilities such as instant messaging, voice, and video calling through which the user can be reached. For example, each endpoint may publish an XML document defining the capabilities of the endpoint. The system aggregates the capabilities of the endpoints associated with a user into an aggregate view of available modes of communication for reaching the user. For example, the presence system may produce an XML document that is an aggregate view of each combination of endpoint and capability through which the user can be reached. Then the presence system publishes the aggregate view so that other users who want to send communications to the user will know the modes of communication available for that user. For example, the presence system may publish the XML aggregate view to a real-time communication server. In this way, a sending user can attempt to communicate with the user using a currently available mode of communication and thus increase the likelihood of reaching the user.

In some embodiments, the presence system selects a preferred endpoint for each mode of communication. The preferred endpoint may be the most active or the most desirable for that service. For example, if the user is available on a laptop and a desktop computer, but has more recently used the laptop, then the laptop may be flagged as the preferred endpoint. Similarly, if two devices can receive instant messages, but one has a better keyboard or other input device, then the better device may be selected as the preferred endpoint. Capabilities for capturing and rendering may also be used to eliminate devices from being selected as preferred that can capture in a format but not render in that format or vice versa. For example, a phone with a display but no keyboard may be able to render instant messaging text on the display, but not send reply text. Therefore, it may be undesirable to mark the phone as preferred for instant messaging. In some embodiments, the endpoint that is marked as the preferred endpoint auto-accepts invitations. For example, if a sending user attempts to communicate with a user that has text capability at both a phone and a desktop computer, but the desktop computer is identified as the preferred device, then the desktop computer will know to accept an invitation for text communications that is received, while the phone will know to reject the invitation.

In some embodiments, the presence system receives preferences from a user that are used to select the preferred endpoint. For example, a user may specify that when the user is away from the office, voice calls by cell phone are the preferred way to reach the user. The presence system may also indicate preferred modes based on events related to the user. For example, if the user is in a meeting, he may prefer to be reached by instant messaging, or if the user is away from his desk, he may prefer to be reached by voice over the phone. The presence system may receive this information from the user, or the presence system may receive information from a separate service, such as a corporate email server, that informs the presence system, for example, when the user is in a meeting. The user may also specify preferences based on the instant messaging state of an endpoint. For example, if the state is "busy," then the user may prefer that email be used to reach him rather than instant messaging.

In some embodiments, each endpoint exposes multiple addresses for sending communications to the endpoint. Each address may have its own list of available capabilities that are published by the presence system for the endpoint. For example, the presence system may publish an XML document specifying each of several Universal Resource Identifiers (URIs) to which communications can be addressed. For each URI, a list of capabilities may follow that URI in the XML document. For example, a URI "sip:ankurc@microsoft.com" may have available capabilities such as text, voice, and video. When aggregating capabilities, the presence system may extract each address for all of the endpoints and produce an aggregate view grouped by address. For example, from multiple XML documents containing capabilities for each of several URIs for various endpoints, the presence system may produce a single service document that specifies the modes of communication available for reaching a user at each URI.

In some embodiments, the presence system receives an express indication from a device that a capability is not available, called a negative capability. For example, a device with no keyboard may indicate that instant messaging is not available. Using negative capabilities may allow the presence system to offer a sending user more ways of reaching a recipient than if the system disabled modes of communication that could not be verified. For example, the presence system might allow the sending user to initiate a voice call to a recipient's cell phone when the presence system does not know if the cell phone is turned on or off. The presence system may optimistically assume that capabilities are available that are not expressly marked as unavailable. While aggregating device capabilities into available modes of communication, the presence system eliminates inconsistent states created by negative capabilities. For example, if one endpoint associated with a user indicates that it does not have instant messaging capability, but another endpoint indicates that it does have instant messaging capability, then the presence system will list instant messaging as an available mode of communication. The presence system may mark the endpoint that indicated that instant messaging capability was available as the preferred endpoint.

In some embodiments, a device sends its capabilities along with a message that initiates a conversation. For example, a device may send its capabilities as an extra header on a SIP INVITE message. For example, a device, such as a cell phone, may indicate that it has slow text capabilities. A device may also send similar information in response to a message that initiates a conversation. For example, if a sending user requests a text conversation with a recipient on a cell phone, the recipient's device may indicate that the text capability is limited in response. The sending user may then be able to select a better mode of communication for interacting with the recipient, or the user interface may indicate to the sending user that the communication will be slow, thereby reducing the frustration of the sending user by properly setting expectations.

In some embodiments, the presence system provides a user interface that indicates the available modes of communication for a particular endpoint. For example, the user interface may display each of a user's devices and each of the modes of communication available on each device. The user interface may also indicate, such as by displaying an asterisk, the modes that are preferred, or which modes are not preferred, such as by graying out or not displaying those modes. The system may also use negative capabilities to disable certain modes in the user interface.

In some embodiments, the user interface provides a shortcut for reaching a user by the user's preferred mode of communication. For example, the user interface may display a "contact user" button that factors in the preferences published for the user's devices and initiates communication with the user using the preferred mode of communication with the user. This provides the sending user with a quick method of reaching the recipient by their preferred mode of communication.

FIG. 1 is a block diagram that illustrates components of the system in one embodiment. The presence system 100 includes a determine endpoint capabilities component 110, an aggregate capabilities component 120, a publish capabilities component 130, a switchboard component 140, a determine communication mode component 150, a user interface component 160, and a send communication component 170. The determine endpoint capabilities component 110 may operate at each endpoint or at a central location and determines the capabilities of each endpoint through which a user is connected to the presence system. For example, if the user is connected with a cell phone, the cell phone will have a voice call capability and may also provide a limited instant messaging capability through a built-in keyboard. The aggregate capabilities component 120 receives the capabilities from each endpoint, and produces an aggregate view of the capabilities available for a user and the modes of communication through which the user can be reached. The publish capabilities component 130 publishes the aggregate view of the modes of communication so that the information is available to other users of the presence system, such as contacts that have subscribed to receive the user's information. The switchboard component 140 is a central server that connects a user publishing information with other users that subscribe to the information or make a request for the information. The determine communication mode component 150 is invoked by a sending user trying to communicate with a recipient to determine the preferred mode of communication to use. The user interface component 160 is used for displaying the available modes of communication for a user, and may also contain an indication, such as an asterisk, next to modes of communication that are preferred for reaching the user. The send communication component 170 is used to initiate a conversation with another user over the chosen mode of communication. For example, if instant messaging is the chosen mode, then the send communication component 170 might send a SIP INVITE message to begin a conversation. The components may reside at various locations throughout the system. For example, the aggregate capabilities component 120 may be a subcomponent of the switchboard component 140 located at an instant messaging server, or the aggregate capabilities component 120 may reside at one of a user's endpoints that is designated to aggregate capabilities for all of the endpoints.

The computing device on which the system is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
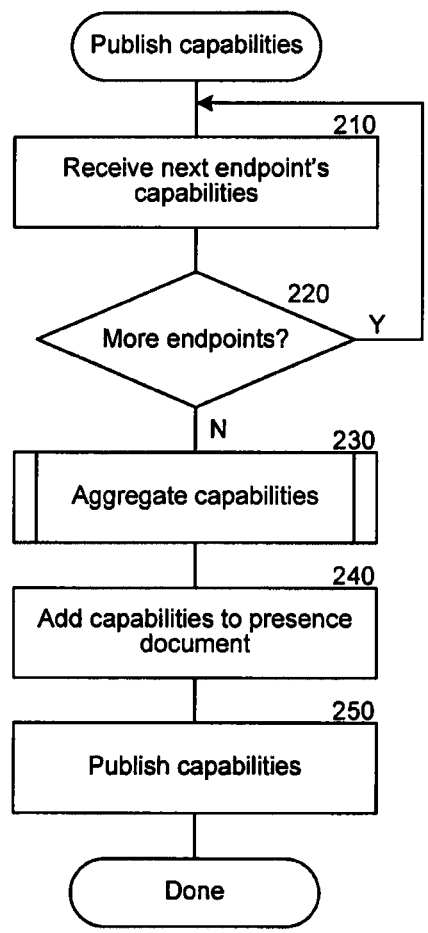
FIG. 2 is a flow diagram that illustrates the processing of the publish capabilities component of the system in one embodiment.

FIG. 2 is a flow diagram that illustrates the processing of the publish capabilities component of the system in one embodiment. The component is invoked when new capabilities are available at an endpoint associated with a user to make the capabilities accessible to other users. In block 210, the component receives capabilities for an endpoint. In decision block 220, if there are more endpoints for the user, then the component loops to block 210 to receive capabilities from additional endpoints, else the component continues at block 230. In block 230, the component aggregates the capabilities received from each endpoint to produce an aggregate view of the user's presence capabilities. In block 240, the component adds the aggregate view of the user's presence capabilities to a presence document or other data structure for publishing the presence capabilities. In block 250, the component publishes the aggregate view of the user's presence capabilities, such as by uploading the new presence document to a real-time communication server. The component then completes.

Figure 3:
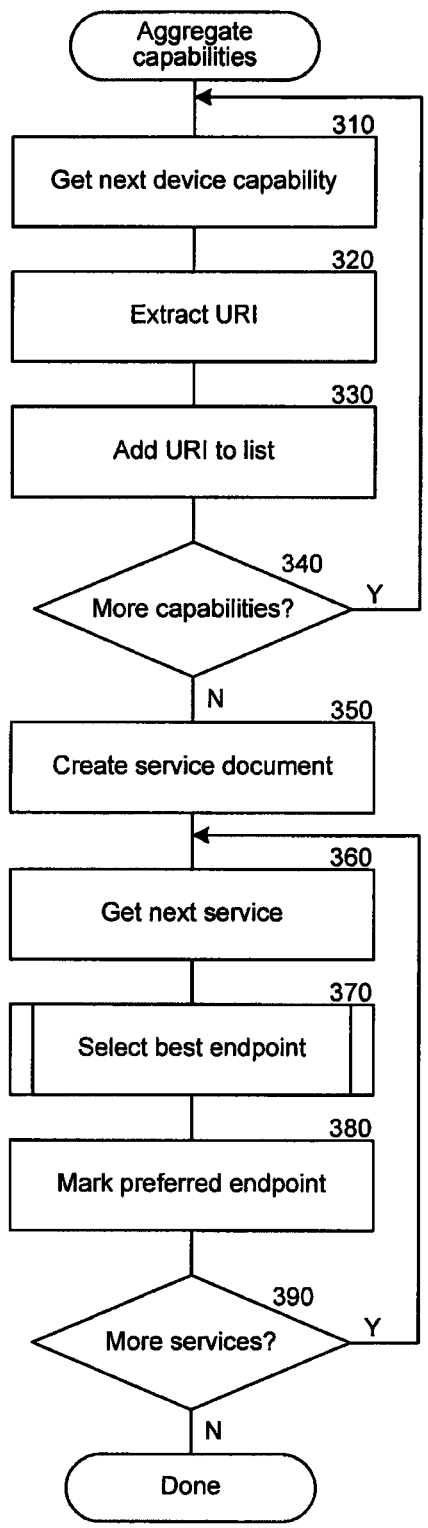
FIG. 3 is a flow diagram that illustrates the processing of the aggregate capabilities component of the system in one embodiment.

FIG. 3 is a flow diagram that illustrates the processing of the aggregate capabilities component of the system in one embodiment. The component is invoked after capabilities have been received from each endpoint associated with a user to produce an aggregated view for publishing to other users. In block 310, the component selects the next received device capability. In block 320, the component extracts the URI from the capability. A device may expose multiple capabilities over multiple URIs, and a service document may be created to indicate the capabilities available for each URI. In block 330, the component adds the URI to a list of extracted URIs if the URI is not already on the list. In decision block 340, if there are more received device capabilities, then the component loops to block 310 to get the next device capability, else the component continues at block 350. In block 350, the component creates a service document for each extracted URI on the list. The service document will indicate each of the modes of communication through which the user can be reached. In block 360, the component gets the next service from the created service documents. In block 370, the component selects the best endpoint to handle communications for each mode of communication available for the service. The best endpoint may be selected based on a variety of factors, such as user preferences, the activity level of the endpoint, or other conditions. In block 380, an indication is placed in the service document to mark the preferred endpoint for each mode of communication, such that if a sending user attempts to communicate with a user using a particular mode of communication, the appropriate device to receive the communication can be easily determined. In decision block 390, if there are more service documents, then the component loops to block 360 to process the next service document, else the component completes.

Figure 4:
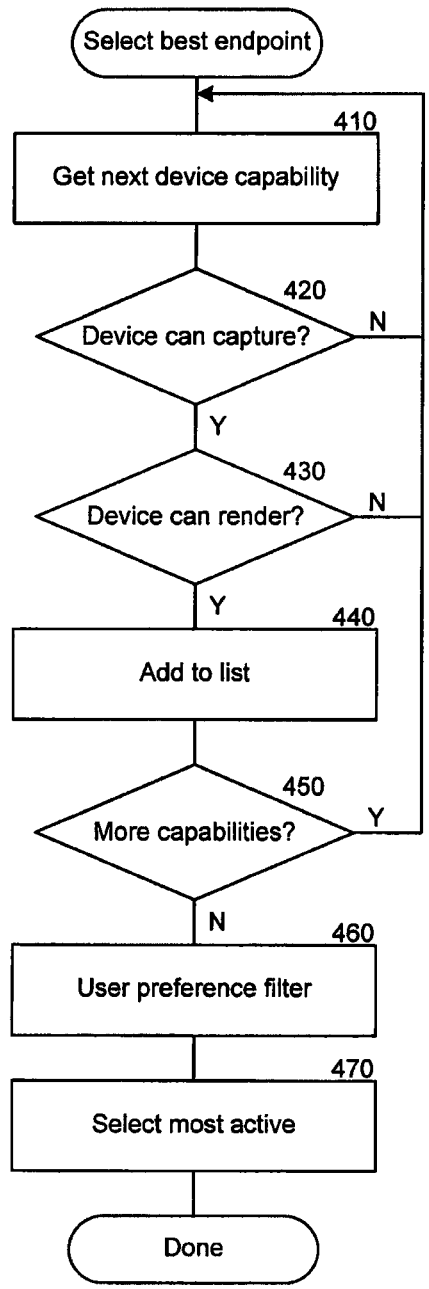
FIG. 4 is a flow diagram that illustrates the processing of the aggregate capabilities component to select the best endpoint for each mode of communication in one embodiment.

FIG. 4 is a flow diagram that illustrates the processing of the aggregate capabilities component to select the best endpoint for each mode of communication in one embodiment. The component is invoked to mark preferred endpoints for each mode of communication within the service document. In block 410, the component selects the next device capability from the service document. In decision block 420, if the device is capable of capturing the mode of communication indicated by the capability, then the component continues at block 430, else the component loops to block 410 to select the next device capability. In decision block 430, if the device can render the mode of communication indicated by the capability, then the component continues at block 440, else the component loops to block 410 to select the next device capability. In block 440, the device is added to a list of potential preferred endpoints for the indicated capability. In decision block 450, if there are more device capabilities in the service document, then the component loops to block 410 to process the next device capability, else the component continues at block 460. Blocks 460 and 470 illustrate two factors that may be used to select the preferred endpoint for a particular mode of communication, but other factors may be used in addition to or in place of these factors. In block 460, the list of potential preferred endpoints is filtered based on user preferences. For example, if a user has set up a preference that indicates that voice calls should not be received when the user is in a meeting, then devices that express a voice call capability may be filtered from the list. In block 470, the component selects the most active endpoint for each mode of communication as the preferred endpoint for that mode of communication and marks the service document to indicate the preference.

FIG. 5 illustrates the XML produced by the aggregate capabilities component in one embodiment. Endpoint A publishes capabilities 510 indicating that text is available as a mode of communication at the URI "sip:ankurc@microsoft.com." Endpoint B publishes capabilities 520 indicating three different URIs and capabilities including text, voice, video, calendar, and voice calls. The URI list 530 indicates the URIs extracted from the device publications. From the device publications, a service document is created for each addressable URI. Three such documents are shown by 540, 550, and 560. Service document 540 is for the URI "sip:ankurc@microsoft.com," and provides capabilities including text, calendar, voice, and video. A preferred endpoint is specified for each capability, as well as for each URI. Based on these service documents, if a text invitation is sent to "sip:ankurc@microsoft.com," then Endpoint A will auto-accept the invitation, since Endpoint A is the preferred endpoint for text communications indicated in the service document for the URI "sip:ankurc@microsoft.com." Similarly, if a calendar publication is made to mailbox "mailto:ankurc@microsoft.com," then Endpoint B will accept the publication since Endpoint B is indicated in the service document for URI "mailto:ankurc@microsoft.com" as the preferred endpoint for calendar communications.

From the foregoing, it will be appreciated that specific embodiments of the presence system have been described herein for purposes of illustration, but that various modifications may be made without deviating from the spirit and scope of the invention. Accordingly, the invention is not limited except as by the appended claims.

We claim:

1. A computer-readable memory storing computer-executable instructions for controlling a device of a sending user to send a communication to an endpoint of a receiving user, the computer-executable instructions for controlling the device to perform a method comprising:
   receiving an aggregate view of modes of communication of the receiving user, a mode of communication is a combination of a capability and an active endpoint of the receiving user, a capability represents a way by which the receiving user can communicate, the aggregate view indicating a preferred active endpoint for a capability and each non-preferred active endpoint for that capability when that capability is available through multiple active endpoints of the receiving user;
   selecting from the aggregate view of the modes of the communication of the receiving user a preferred mode of communication for the sending user to communicate with the receiving user; and
   initiating a communication from the sending user to the receiving user based on the selected preferred mode of communication by sending an invitation that is automatically accepted by the receiving user when the active endpoint of the selected preferred mode of communication is the preferred active endpoint for the capability of the selected preferred mode of communication for the receiving user.

2. The computer-readable memory of claim 1 including prior to receiving the aggregate view, sending a request to subscribe to the aggregate view.

3. The computer-readable memory of claim 1 wherein the received aggregate view indicates the preferred mode of communication for communicating with the receiving user.

4. The computer-readable memory of claim 1 wherein the sending user selects the mode of communication for the sending user to communicate with the receiving user.

5. The computer-readable memory of claim 1 wherein the device sends the communication via cellular network.

6. A computer-readable memory storing computer-executable instructions for controlling a device of a receiving user to receive a communication from a sending user, the device being an active endpoint of the receiving user, the computer-executable instructions comprising:
   instructions that receive an aggregate view of modes of communication of the receiving user, a mode of communication is a combination of a capability and an active endpoint of the receiving user, a capability represents a way by which the receiving user can communicate, the aggregate view indicating a preferred active endpoint for a capability;
   instructions that receive from the sending user an invitation to initiate a communication with the receiving user using a specified capability;
   instructions that determine based on the received aggregate view whether the device is the preferred active endpoint for communicating via the specified capability; and
   instructions that, upon determining that the device is the preferred active endpoint for communicating via the specified capability, automatically accept the invitation.

7. The computer-readable memory of claim 6 including prior to receiving the aggregate view, sending a request to subscribe to the aggregate view.

8. The computer-readable memory of claim 6 including instructions that receive an aggregate view of modes of communication of the sending user, a sending mode of communication of the sending user is a combination of a capability and an active endpoint of the sending user, the aggregate view indicating a preferred active endpoint for each capability, one of the modes of communication of the sending user being the preferred mode of communication;
   instructions that display a contact user button for initiating a communication with the sending user; and
   instructions that, upon receiving a selection of the contact user button by the receiving user, initiate a communication from the receiving user to the sending user based on the preferred mode of communication.

9. The computer-readable memory of claim 6 including instructions that, prior to receiving the aggregate view of modes of communication of the sending user, sending a request to subscribe to the aggregate view of the sending user.

10. The computer-readable memory of claim 6 wherein the device sends the communication via cellular network.

11. A device for a sending user to send a communication to an active endpoint of a receiving user, comprising:
   a computer-readable memory storing computer-executable instructions of:
      a component that receives an aggregate view of modes of communication of the receiving user, a mode of communication is a combination of a capability and an active endpoint of the receiving user, a capability represents a way by which the receiving user can communicate, the aggregate view indicating a preferred active endpoint for each capability; and
      a component that initiates a communication from the sending user to the receiving user based on a selected mode of communication by sending an invitation that is automatically accepted by the receiving user when the active endpoint of the selected mode of communication is the preferred active endpoint for the capability of the selected mode of communication for the receiving user; and
   a processor that executes the computer-executable instructions stored in the memory.

\* \* \* \* \*